March 24, 1936.  A. KOWALSKY  2,034,912
DISCHARGE ARM FOR CORN BINDERS
Filed July 31, 1935
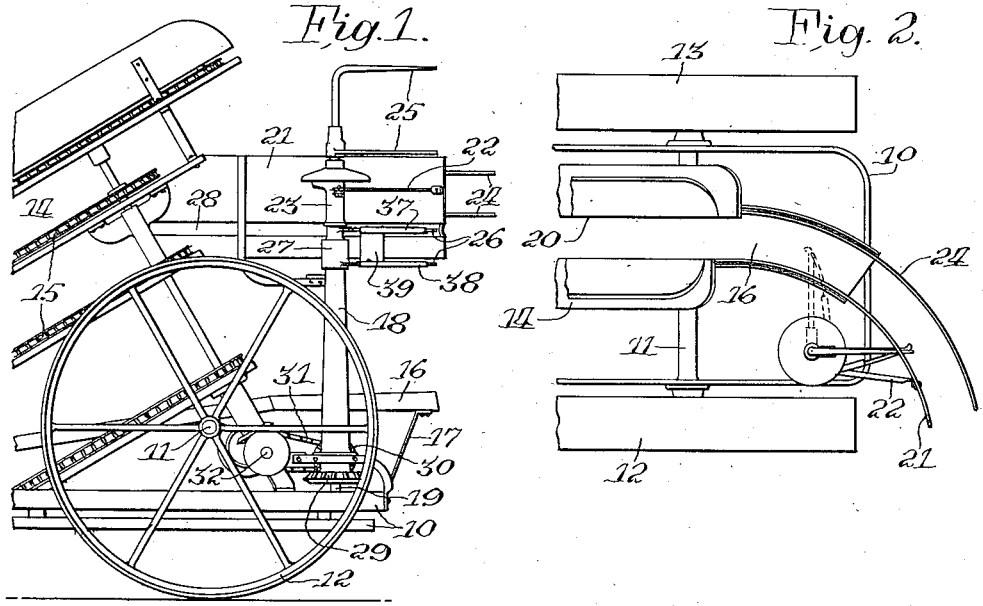

Patented Mar. 24, 1936

2,034,912

UNITED STATES PATENT OFFICE 2,034,912

DISCHARGE ARM FOR CORN BINDERS

Andrew Kowalsky, Oak Park, Ill., assignor to International Harvester Company, a corporation of New Jersey Application July 31, 1935, Serial No. 33,946

8 Claims. (Cl. 56—67)

The invention relates to corn binders, and particularly to the bundle discharge arms used therewith.

In the vertical type corn binder these arms are mounted on and movable with a vertically disposed rotatable shaft, one of the arms usually passing through a slot formed in a shield which serves to hold the stalks in erect position while the bundles are being tied. The conventionally constructed discharge arm that passes through said slot is frequently fouled in certain conditions by loose crop material. Also, such material frequently is bunched by the arm and jammed against the shield to such an extent that the arm does not properly perform its bundle discharging function. It is found in such conditions, by changing the contour of the bundle engaging edge of the arm, that this difficulty is readily overcome. Accordingly, the invention relates especially to the provision of a shield attachment for such discharge arm, the purpose of the attachment being to cause the arm to have a differently shaped working edge whereby the said edge of the arm will be presented to the bundle to be discharged in a manner to make the arm self-cleaning, with the working edge thereof disposed at such an angle to the shield as to prevent bunching and wadding of loose material.

The main object of the invention is to provide an improved bundle discharge arm for harvesters.

Another object is to provide a device in the nature of an attachment for bundle discharge arms of harvesters to cause the arm to function without fouling.

Another object is to provide such a device in the nature of an attachment that may be quickly applied to or removed from the arm without much effort and without the need of any special tools.

Still another important object is to provide an improved bundle discharge arm for corn binders, and the like.

Briefly, these desirable objects are achieved by providing a shield attachment device for the discharge arm, along with quick attaching and detaching means, whereby the operating edge or face of the arm will have a contour that will better cooperate with the shield through which it passes, and the crop material to prevent objectionable bunching of material and fouling of the arm.

In the accompanying sheet of drawings the improved attachment is provided, by way of illustration, for the double type of discharge arm. In the drawing:

Figure 1 is a side elevational view of the rear end of a vertical corn binder showing the bundle discharging mechanism;

Figure 2 is a plan view of the rear end of the corn binder substantially as it appears in Figure 1;

Figure 3 is an enlarged detail view of one of the discharge arms, showing the improved supplementary part attached thereto, the arm shown being of the double type;

Figure 4 is a side elevational view of the structure shown in Figure 3;

Figure 5 is a vertical cross-sectional view through the discharge arm structure taken along the line 5—5 of Figure 4, looking in the direction of the arrows; and, Figure 6 is a detail plan view of the supplement or attachment per se.

The corn binder shown in Figures 1 and 2 is of the conventional vertical type and embodies a main frame 10, an axle 11, and a pair of ground wheels 12 and 13. The forward end of the frame carries a crop gathering mechanism generally shown at 14, the same including chains 15 for moving the corn stalks severed by the machine in erect position with their butt or lower ends being dragged by the chains in erect position over the butt pan 16. This butt pan is appropriately carried, for example, by a bracket 17 on the main frame 10.

In any conventional manner there is carried at the rear end of the frame a vertical, hollow standard 18, in which is journaled for rotation a vertical shaft 19. The crop gathering mechanism is so formed as to provide a longitudinal passage-way 20 above the butt pan 16, said passage at its rear end being defined by a rearwardly and laterally curved shield 21 which is appropriately braced by a brace 22 to a collar 23, which carries the upper end of the shaft 19. The rear end of this passage-way 20 is further delineated by a pair of guide rods 24 arranged one above the other, as shown in Figure 1. The stalks of corn are accumulated in a bunch at the rear end of the butt pan in the passage adjacent the shield 21 and are there bound by binder mechanism of conventional pattern not necessary to be disclosed herein. When the bundle has been bound, it must be discharged from the machine rearwardly between the fingers 24 and shield 21 to a position laterally behind the wheel 12 and toward the stubbleward side of the machine in its travel around the field.

Such discharge of the bundles is accomplished by a number of discharge arms 25 carried to turn with the upper end of the shaft 19 and also by a pair of discharge arms 26 connected to a collar 27 keyed to turn with the shaft 19 at a point substantially below the discharge arms 25. As the two arms 26 are connected to a common sleeve or collar 27, they, of course, turn together as a unit, the upper one of said arms traveling through a slot 28 formed in the shield 21.

The lower end of the shaft 19 carries a bevel gear 29 driven from a bevel gear 30 suitably mounted on a shaft which receives power from a chain 31 driven from suitable means, not shown, and carried on a shaft 32, which in turn receives power by means, not shown, from the ground drive wheel 12.

In certain operating conditions, especially when the corn is short, or when cutting soy beans, it has been found that the stalk engaging edge of the arms 26, which is shown at 33, is of the wrong contour efficiently to engage and discharge the bundle. It so happens under such crop conditions that the radial edge 33 meets the shield 21 as it is about to pass therethrough at such an angle that bunching and wadding of the short corn or soy beans results, thus fouling the discharge arms 26 and preventing them from cleanly engaging and discharging the bundle.

It is desirable, therefore, that an auxiliary or supplementary device in the nature of a shield be provided as an attachment for the regular discharge arms 26 to make them function efficiently under the conditions of use above described, so that the arms cannot bunch the material nor become fouled.

Accordingly this invention provides a shield which, as shown in Figures 3 to 6, inclusive, embodies an upper plate 34 disposed horizontally and a lower plate 35 also disposed horizontally. These plates 34 and 35 are arcuately formed, as shown in Figure 3, and curled around their forward outer side edge is a sheet metal shield 36, which is extended forwardly and formed with lateral ears 37' that overlie snugly the front upper and lower edges of the respective arms 26. There is thus provided an upper and lower rounded, curled edge 37 and 38 for the upper and lower arms 26, which presents smooth surfaces and forms an arcuated non-radial portion for the arms 26 in lieu of the regular, radial, straight edge portion 33. As shown in Figure 5, the upper curled edge 37 is continued and bent back upon itself to extend under the top plate 34 and then formed with a vertical web portion 39 which at its lower end is bent back over the top surface of the lower plate 35 to merge with the curled portion 38 thereof heretofore described. Each plate 34 and 35 carries a rivet pin 40 to which is connected the eye of an eye bolt 41 on the inside of the discharge arm assembly, said bolts being passed through holes in the connecting web 39 to extend outwardly from the back side of the structure, as shown in Figure 5. Thereupon a stiffening plate 42 provided with holes to receive the bolts is put in place, as shown in Figure 5, and nuts 43 are then used to clamp the discharge supplementary shield 36 securely in place on the arms 26.

In use now the edges 37 and 38 are the effective edges of the arms 26 and engage the corn bundle in such a manner that the arms cannot become fouled or objectionably bunch the material because the curved edge 37 passes through the slot 28 in such a manner that it clears itself of any loose crop material as the bundle is engaged thereby. The operative position of the shield on the arm, when it is being presented to a bundle, is shown in dotted lines in Figure 2.

This shield attachment obviously can easily be mounted on the arms 26 or be removed therefrom in the field without causing undue delay, nor are any special tools required.

While in the present disclosure the improved discharge arm has been shown and described for use with corn binders, it is to be understood, however, that the arm may also be used on other harvesters, such as hemp and grain harvesters, where it is desirable to prevent weeds from winding.

It is the intention to cover all such changes and modifications of the specific embodiment herein shown which do not depart from the spirit and scope of the invention as covered by the following claims.

What is claimed is:

1. In a binder the combination with a rotary shaft carrying a bundle discharge arm having a substantially radial bundle engaging edge, of a supplement for said arm comprising a shield having means for attaching the same to the arm and serving to present a non-radial curved edge for engaging a bundle.

2. In a binder the combination with a rotary shaft carrying a collar and a bundle discharge arm, said arm being secured to the collar and having a substantially radial bundle engaging edge, of a supplement for said arm comprising a shield having a non-radial curved edge including a plate having one end engaging the collar and its other end attached to the bundle engaging edge of the shield, and means for fastening the plate with the shield to said arm.

3. In a binder the combination with an upright rotary shaft carrying a collar and bundle discharging means comprising a pair of spaced parallel horizontal arms each of which is disposed in the same plane and each presenting a substantially radial bundle engaging edge, of a supplement for said arms comprising a shield fitted over the arms and including means for fastening the shield to said arms, said shield being formed to present non-radial curved bundle engaging edges for the arms.

4. In a binder the combination with an upright rotary shaft carrying a collar and bundle discharging means comprising a pair of spaced parallel horizontal arms each of which is disposed in the same plane and each presenting a substantially radial bundle engaging edge, of a supplement for said arms comprising a pair of arcuate horizontal plates including a shield secured thereto and presenting curved non-radial bundle engaging edges, said edges being curled over the adjacent edges of the respective plates with the outer ends of said edges formed to fit over the respective arms near their outer ends, the free inner ends of said plates engaging the collar, and means carried by the plates for detachably securing the shield to the arms.

5. In a corn binder the combination with an upright rotary shaft carrying a collar and bundle discharging means comprising a pair of spaced parallel horizontal arms each of which is disposed in the same plane and each presenting a substantially radial bundle engaging edge, of a supplement for said arms comprising a pair of arcuate horizontal plates including a shield secured thereto and presenting curved non-radial bundle engaging edges, said edges being curled over the adjacent edges of the respective plates with the outer ends of said edges formed to fit over the respective arms near their outer ends, the free inner ends of said plates engaging the collar, and means carried by the plates for detachably securing the shield to the arms, said means comprising a pair of bolts, a bar spanning the rear edge of the arms and being apertured to receive the bolts, and nuts on the bolts to clamp the bar to the arms to secure the shield thereto.

6. A supplement for a corn binder bundle discharge arm, said supplement comprising an arcuate plate, a shield having an arcuate curled edge fitted over the plate, one end of said edge being formed to overlap the free end of the arm, the major portion of said curled edge being angularly spaced from the normal bundle engaging edge of the arm, and means for securing said shield detachably to the arm.

7. A supplement for a corn binder bundle discharge means comprising two horizontal spaced parallel arms, said supplement comprising a pair of arcuate plates, a channel shaped shield having spaced arcuate curled edges respectively fitted over the edges of the plates, proximate ends of said curled edges at one end being formed respectively to overlap the free ends of the arms, the major portion of each curled edge being angularly and arcuately spaced from the normal bundle engaging edge of the arms, and means carried by the plates for fastening the shield to the arms.

8. A binder having a rotary shaft, a bundle discharge arm carried thereby, said arm having one edge arranged radially with respect to the shaft and having its other or bundle engaging edge curved in an arc and disposed non-radially relative to the shaft.

ANDREW KOWALSKY.